3,162,682
DISPROPORTIONATION REACTION OF ALPHA, BETA - ETHYLENICALLY UNSATURATED ALDEHYDES IN THE PRESENCE OF A SILVER CATALYST
Adolph C. Shotts, Maplewood, and Bonnie M. Lloyd, Lake Charles, La., assignors, by mesne assignments, to Cities Service Research and Development Company, New York, N.Y., a corporation of New Jersey
No Drawing. Filed Dec. 28, 1959, Ser. No. 862,057
9 Claims. (Cl. 260—523)

This invention relates to an improved method of effecting the disproportionation of an $\alpha,\beta$-unsaturated aldehyde into its corresponding $\alpha,\beta$-unsaturated acid and alcohol. In brief, the improved method comprises conducting the reaction in the presence of a catalyst having silver as its principal active ingredient and using a dilute alkaline reaction medium.

The $\alpha,\beta$-unsaturated aldehydes within the scope of this invention are those which conform to the following formula:

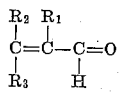

wherein $R_1$, $R_2$, and $R_3$ are members selected from the class consisting of hydrogen, (lower) alkyl, aryl and aralkyl groups or radicals. The term "(lower) alkyl" is used here and in the appended claims as defining a straight chain or branched chain alkyl group, containing from one to five carbon atoms.

The reaction to which the improvement of the instant invention is applicable is the reaction in which two aldehyde groups are transformed into the corresponding hydroxyl and carboxyl functions, existing separately or in combination as an ester. Such a reaction is represented by the following general equations.

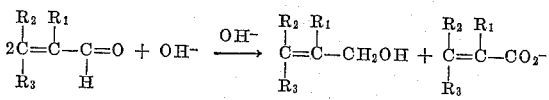

wherein $R_1$, $R_2$ and $R_3$ are defined as set forth above. Thus, in this reaction the aldehyde function simultaneously acts both as the oxidizing agent, in the oxidation of the aldehyde function to the carboxyl function, and as the reducing agent, in the reduction of the aldehyde function to the hydroxyl function. To those skilled in the art this type reaction is generally known as a Cannizzaro reaction. Because the name Cannizzaro reaction carries with it the connotation that the reaction is carried out in the presence of a concentrated (50% or greater) basic solution, the more general, all-inclusive, term, disproportionation more aptly describes this type of compensated oxidation-reduction process.

The process of the present invention consists of disproportionating an $\alpha,\beta$-unsaturated aldehyde, as defined above, in the presence of a catalyst containing silver as its principal active ingredient, and preferably the catalyst is finely divided metallic silver and the reaction is carried out in an aqueous dilute alkali solution, in such a manner the concentration of free base does not exceed a value of approximately 10% by weight.

Several workers have in the past attempted to devise a suitable process for disproportionating $\alpha,\beta$-unsaturated aldehydes into their corresponding acid and alcohols. However, none of these processes has proved to be entirely satisfactory as a preparative method for both the product acid and the product alcohol or their esters. In the disproportionation of an $\alpha,\beta$-unsaturated aldehyde there are several competitive reactions involved in addition to the main reaction. Thus, the action of the aqueous or alcoholic alkali may lead to cleavage of the olefinic bonding, or there may be condensation of the aldol type, or self condensation of the aldehyde functions to yield dimers or trimers, or possibly polymerization reactions involving the olefinic bonding of the aldehyde or the product acid and product alcohol. To devise a suitable process for the preparation of the subject acids and alcohols, then, these competitive reactions must be subjugated to the dominating influence of the disproportionation reaction. It has now been found that the dominating role of the disproportionate reaction is brought about by conducting the reaction in the presence of a silver catalyst and with a reaction medium that is dilutely alkaline. It may be theorized that in the present process the metallic silver not only catalyzes the reaction, but in all probability also affords protection to the olefinic bonding, and the use of the dilute alkali retards the condensation and polymerization reactions.

The catalyst employed in the present invention is finely divided silver preferably prepared by the reduction of a silver compound. The preferred method of preparing the silver catalyst is to reduce an alkaline suspension of silver oxide by utilizing hydrogen peroxide as the reducing agent. Instead of using silver oxide directly as the source of silver, one may initially use a solution of a silver compound, such as silver nitrate, and treat the solution with an alkali, such as sodium hydroxide, followed by treatment with the reducing agent, instead of using hydrogen peroxide as the reducing agent, other inorganic reducing agents, such as aluminum, or organic reducing agents, such as aldehydes, tartaric acid, or reducing sugars, may be used. One advantageous method of preparing the catalyst is to treat an alkaline suspension of silver oxide with a portion of the aldehyde to be employed in the reaction thereby utilizing it as the reducing agent. The concentration of silver employed as the catalyst may vary over a wide range, thus concentrations of about one percent to about thirty percent have been found to be effective. Preferably a catalyst concentration in the range of about fifteen to twenty-five percent is used. These percentage concentrations are expressed as percentage by weight of the reaction mixture. The silver catalyst may be used repeatedly until it becomes inactive by reason of being poisoned or fouled. Poisoning and fouling are minimized by using reagents which are essentially free of known catalyst poisons. When the catalyst becomes inactive it may be reactivated by washing with organic solvents and inorganic solutions before reuse. In extreme cases of poisoning, the spent catalyst can be redissolved in nitric acid, the silver nitrate purified, and new catalyst prepared from it.

In addition to the silver catalyst, the other critical factor is the concentration of the basic material. As is indicated by the above equation, one equivalent of base is necessary to effect the disproportionation reaction of the aldehyde and, in addition, an excess of base is necessary to promote and insure completion of the reaction. The presence of too high a concentration of base will tend to promote the other competitive reactions of the aldehyde or of the product alcohol and product acid and thus diminish the yields of those products. Also, with aldehydes having $\alpha$-hydrogen, a high concentration of base makes the process entirely inoperative due to the tendency of such aldehydes to undergo an aldol condensation in preference to the disproportionation reaction.

Several different manipulative methods are applicable for providing means whereby the reactant aldehyde and the base may be reacted, without providing too high a basic concentration. The preferred method is to add to the reaction zone, increment by increment or continuously, an aqueous alkaline solution of known predetermined concentration and simultaneously to add to the reaction zone, increment by increment or continuously, the aldehyde reactant. By using a ratio of slightly more than the molar amount of base to the amount of aldehyde used, the basic concentration of the reaction mixture is increased so as to provide the necessary excess basic concentration to insure a substantially complete reaction, without providing so high a basic concentration as to promote the undesirable side reactions. Although the base may be added at rates up to about three times that necessary to react with the aldehyde, the preferred rate is to add, calculated on a molar basis, for every mole of aldehyde, 1.05–1.08 moles of base. The concentration of free base, i.e. base not neutralized by the product acid or consumed in the disproportionation reaction, should not exceed a value of greater than about ten percent by weight of the total reaction mixture.

Another method of carrying out the disproportionation reaction is to include in the reaction mixture, in addition to the silver catalyst, the reactant aldehyde and then to add to this an aqueous solution of the base.

A clearer understanding of both of these methods may be obtained from the examples given below.

The aldehyde may be added in the pure undiluted form, if the aldehyde is a liquid or it may be added as a solution of aldehyde in a suitable solvent, such as ethanol. Provided the alcohol has a sufficiently low boiling point, it may be added in the gaseous form, either pure or diluted with an inert gas, such as nitrogen. When the reactant aldehyde is a solid the preferred method of addition is as a solution of the aldehyde in an inert solvent, such as ethanol.

In some cases it may be necessary to supplement the water solvent with an additional solvent, such as ethanol, to insure proper dispersion of the reactant aldehyde. Or as indicated above, additional solvent, other than water, may be introduced in the reaction mixture in conjunction with the reactants. Whatever the case, the term "aqueous alkaline reaction mixture" as applied to the reaction mixture as used herein and in the appended claims, to include any additional solvent.

The basic material used may be any of the common inorganic bases. Thus, one may use the alkali metal hydroxides, such as lithium hydroxide, sodium hydroxide, potassium hydroxide or ammonium hydroxide; or the alkaline earth hydroxide, such as magnesium hydroxide, calcium hydroxide or barium hydroxide. The use of alkali metal hydroxide is preferred because of their greater water solubility, which makes possible the use of lower volumes of water in the reaction.

Also, it is imperative that the aldehyde disproportionate in the shortest possible time after it is introduced into the reaction mixture; to insure this, is preferred to use a reactor whereby practically instantaneous mixing of the aldehyde, base and catalyst can be obtained. One such a reactor is described in detail in the example below.

The reaction temperatures utilized may be in the range of 0° C. to 100° C. A reaction temperature of higher than 100° C. may be used provided pressures greater than atmospheric are imposed on the reaction. Preferably the initial temperature of the reaction mixture is in the range of 20° to 30° C. No great advantage is obtained using high temperatures as these tend to promote polymerization and other side reactions.

The reaction products may be recovered by any of the standard means. Thus, the alkaline reaction mixture after removal of the catalyst may be extracted with a suitable solvent to remove the alcoholic product, followed by acidification of the reaction mixture and extraction to remove the product acid, or upon acidification, the product acid may precipitate and be recovered by this means, or the acid may be separated by the formation and precipitation of an insoluble salt. It may be desirable not to separate the product acid from the alkaline solution, but treat the solution of the acid with addition reagents to bring about reactions such as esterification, polymerization, etc.

A clearer understanding of the improved process of this invention may be obtained from the examples given below, which disclose the best modes of carrying out this invention.

*Example 1*

The reactor consists of a cylindrical glass vessel with a fritted-glass bottom. It is equipped with a stirrer, thermometer and an ice water condenser, which is vented through a "Dry Ice" acetone trap. Addition of the alkaline solution to the reaction mixture is by means of a dropping funnel. The aldehyde feed consists of a tube with a dropper tip extending below the surface of the reaction mixture and positioned close to the fritted glass bottom of the reactor. In addition to the agitation provided by the stirrer, it is also advantageous to provide additional agitation and dispersion by passing an inert gas, such as nitrogen, upwardly through the fritted glass bottom.

The metallic silver catalyst is prepared by suspending 12.5 grams of silver oxide in 40 ml. of water, making the suspension sufficiently basic by the addition of three drops of 14% sodium hydroxide and then adding dropwise 6.13 grams of 30% hydrogen peroxide. During the reduction the temperature is maintained at 25° to 30° C. by means of an ice bath and agitation is provided by allowing nitrogen to flow through the fritted glass bottom at a rate of approximately 230 ml. per minute, and by the stirrer.

For the disproportionation reaction, methacrolein is fed into the catalyst-containing reaction mixture at a rate of 0.55 ml. per minute and a 14% sodium hydroxide solution is introduced by means of the dropping funnel at a rate of approximately 1.78 grams per minute. The reaction is continued for 45 minutes and at the end of this time 80 grams of the 14% solution of sodium hydroxide has been added. This amounts to a total of 11.2 grams (0.28 mole) of sodium hyroxide. The total volume of methacrolein added is 25 ml. (88.5% purity) or 18.4 grams (0.262 mole). The catalyst was filtered from the reaction mixture and the alkaline filtrate extracted with diisopropyl ether to remove the methallyl alcohol product. The ether extract is concentrated and the yield of methallyl alcohol is 3.9 grams (0.054 mole, 41.3% yield). The aqueous alkaline solution is acidified with dilute hydrochloric acid and extracted with diisopropyl ether. The ether extract is concentrated and gave 4.6 grams (0.054 mole, 41.3% yield) of methacrylic acid.

*Example 2*

This disproportionation reaction is carried out in a reactor similar to that described in Example 1. The metallic silver catalyst is prepared by suspending 15 grams of silver and in 40 ml. of water, adding 4 drops of 14% sodium hydroxide and then adding dropwise 7.36 grams of 30% hydrogen peroxide. The temperature of the reaction mixture is maintained at 25°–30° and nitrogen is allowed to flow through the fritted glass bottom of the reactor.

After the preparation of the catalyst, cinnamic aldehyde is fed into the reaction mixture at a rate of approximately 0.55 ml. per minute and a 33.3% solution of sodium hydroxide is added at approximately the same rate. The initial temperautre of the reaction mixture is 25°–30° C. and during the reaction agitation is provided by means of the stirrer and nitrogen flowing through the fritted glass bottom of the reactor. The addition of cinnamic aldehyde and sodium hydroxide solution is continued until a total of 20 ml. of aldehyde (.156 mole) and 20 ml. of sodium hydroxide solution (.167 mole NaOH) had been added. The catalyst is filtered from the reaction mixture and the alkaline filtrate is extracted with diisopropyl ether. Concentration of the ether solution results in a substantial yield of cinnamyl alcohol. The alkaline aqueous extract is acidified with diluted hydrochloric acid and extracted with diisopropyl ether. A good yield of cinnamic acid is obtained upon removal of the ether solvent.

Example 3

A reactor similar to that of described in Example 1 is used in the following procedure. The catalyst is prepared by reducing an alkaline suspension of 20 grams of silver oxide in 40 ml. of water by 9.8 grams of 30% hydrogen peroxide.

Acrolein is fed into the reaction mixture containing the silver catalyst at a rate of 0.55 ml. per minute and 38% solution of sodium hydroxide is introduced at a rate of 1.10 ml. per minute. The initial temperature of the reaction mixture is held between 15° and 20° C. and during the reaction agitation, in addition to the stirring, is provided by introducing nitrogen gas through the fritted glass bottom of the reactor at a rate of approximately 150 ml. per minute. The addition of the aldehyde and the basic solution is continued until a total of 20 ml. (0.355 mole) of acrolein and 40 ml. (0.378 mole NaOH) of the sodium hydroxide solution has been added. After completion of the addition of the reactants, the catalyst is filtered from the reaction mixture and the alkaline filtrate is extracted with diethyl ether. Concentration of the ether extract results in a substantial yield of allyl alcohol. The alkaline extract is acidified with dilute hydrochloric acid and then is extracted with diethyl ether. Removal of the ether solvent leaves a good yield of acrylic acid.

Example 4

The disproportionation of α-methyl-β-ethylacrolein into 2-methyl-2-pente-1-ol and 2-methyl-2-pentenoic acid is conducted in a reactor like that described in Example 1. The metallic silver catalyst is prepared by reducing an alkaline suspension of 10 grams of silver oxide in 40 ml. of water by 4.91 drops of 30% hydrogen peroxide.

The aldehyde α-methyl-β-ethylacrolein is fed into the silver catalyst-containing reaction mixture at a rate of 0.55 ml. per minute. The alkaline reagent, a 22% solution of sodium hydroxide is added at a rate of 1.10 ml. per minute. The initial temperature of the reaction mixture is in the range of 25° C.–30° C. Agitation supplemental to that which is provided by the stirrer, is provided by passing nitrogen through the fritted glass bottom of the reactor at a rate of about 250 ml. per minute. After the addition of about 20 ml. (0.204 mole) of α-methyl-β-ethylacrolein and 40 ml. (0.214 mole NaOH) of the 22% sodium hydroxide solution, the reaction is discontinued. The reaction mixture is filtered to remove the catalyst and then is extratced with diisopropyl ether. The diisopropyl ether extract is concentrated and an excellent yield of 2-methyl-2-penten-1-ol is obtained. The aqueous alkaline solution is acidified with dilute hydrochloric acid and is then extracted with diisopropyl ether. Concentration of the ether extract leaves a susbtantial yield of 2-methyl-2-pentenoic acid.

Example 5

The replacement of the methacrolein of Example 1 by similar molar quantities of equivalent aldehydes results in the formation of comparable quantities of their corresponding alcohol and acid. Thus, when crotonaldehyde, α-methylcrotonaldehyde, β-cyclohexylacrolein, α-methylcinnamic aldehyde, 2-ethyl-2-hexenal, α-isopropylacrolein, β-benzylacrolein, and β,β-dimethylacrolein are disproportionated according to the procedure of Example 5, excellent yields of a crotonic acid and crotonyl alcohol; α-methylcrotonic acid and α-methylcrotonyl alcohol; β-cyclohexylacrylic acid and β-cyclohexylallyl alcohol; α-methylcinnamyl alcohol and α-methylcinnamic acid; 2-ethyl-2-hexenoic acid and 2-ethyl-2-hexenol; α-isopropylacrylic acid and α-isopropylallyl alcohol; β-benzylacrylic acid and β-benzylallyl alcohol; and β,β-dimethylacrylic acid and β,β-dimethylallyl alcohol, respectively, are formed.

Example 6

A reactor similar to that described in Example 1 is used in this reaction, except the aldehyde feed tube is not used. The silver catalyst was prepared in a manner analogous to that described in Example 1. Thus, an alkaline suspension of 12.5 grams of silver oxide in 87.2 ml. of water was reduced with 6.13 grams of 30% hydrogen peroxide.

Methacrolein (18.4 grams, 0.262 mol) is added to the silver suspension in the reactor and the temperature of the reaction mixture is adjusted to 25°–30° C. A 45% solution of sodium hydroxide is then introduced into the reaction mixture at a rate of 0.55 ml. per minute. During the addition of the base solution, the reaction is vigorously agitated by the stirrer and nitrogen flowing through the fritted glass bottom of the reactor (rate of nitrogen flow about 150 ml. per minute). After the addition of 25 ml. of the sodium hydroxide solution (0.28 mole), the reaction mixture is filtered to remove the catalyst. The alkaline filtrate is extracted with diisopropyl ether to remove the alcoholic product. After concentration of the ether solution a substantial yield of methallyl alcohol is obtained. The aqueous alkaline solution is acidified with dilute hydrochloric acid and then is extracted with diisopropyl ether. A good yield of methacrylic acid is obtained after the removal of the ether solvent.

Although a batch process has been described, the reaction may be conducted continuously, preferably in a reactor which provides agitation, such as by baffles. A convenient method of determining the concentration of base is by means of pH measurements.

We claim:

1. In a process of producing an α,β-unsaturated alcohol and an α,β-unsaturated acid by disproportionating the α,β-unsaturated aldehyde corresponding thereto, said aldehyde having the formula,

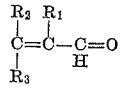

wherein $R_1$, $R_2$ and $R_3$ are members selected from the group consisting of hydrogen, lower alkyl, phenyl, benzyl and cyclohexyl, the improvement of effecting said disproportionation in an aqueous alkaline reaction mixture consisting essentially of the said α,β-unsaturated aldehyde, a finely divided metallic silver catalyst, and an aqueous alkaline reaction media, said finely divided metallic silver catalyst being present in a concentration of from about one per cent to about thirty per cent by weight of the total reaction mixture, said aqueous alkaline reaction media having a maintained concentration of a free base, selected from the group consisting of an alkali metal hydroxide and an alkaline earth hydroxide, of not greater than about ten per cent by weight of the total reaction mixture, and said disproportionation being effected at a reaction temperature of from about 0° C. to about 100° C.

2. The process of claim 1, wherein the aldehyde is acrolein.

3. The process of claim 1, wherein the aldehyde is methacrolein.

4. The process of claim 1, wherein the aldehyde is crotonaldehyde.

5. The process of claim 1, wherein the aldehyde is cinnamic aldehyde.

6. The process of claim 1, wherein the aldehyde is α-methylcinnamic aldehyde.

7. In a process of producing allyl alcohol and acrylic acid by the disproportionation of acrolein, the improvement of effecting said disproportionation in an aqueous alkaline reaction mixture consisting essentially of acrolein, a finely divided metallic silver catalyst, and an aqueous alkaline reaction media, said finely divided metallic silver catalyst being present in a concentration of from about one percent to about thirty percent by weight of the total reaction mixture, said aqueous alkaline reaction media having a maintained concentration of a free alkali metal hydroxide of not greater than about ten percent by weight of the total reaction mixture and said disproportionation being effected at a reaction temperature of from about 15° C. to about 65° C.

8. In a process of producing methallyl alcohol and methacrylic acid by the disproportionation of methacrolein, the improvement of effecting said disproportionation in an aqueous alkaline reaction mixture consisting essentially of methacrolein, a finely divided metallic slver catalyst, and an aqueous alkaline reaction media, said finely divided metallic silver catalyst being present in a concentration of from about one percent to about thirty percent by weight of the total reaction mixture, said aqueous alkaline reaction media having a maintained concentration of a free alkali metal hydroxide of not greater than about ten percent by weight of the total reaction mixture and said disproportionation being effected at a reaction temperature of from about 15° C. to about 65° C.

9. In a process of producing crotonyl alcohol and crotonic acid by the disproportionation of crotonaldehyde, the improvement of effecting said disproportionation in an aqueous alkaline reaction mixture consisting essentially of crotonaldehyde, a finely divided metallic silver catalyst, and an aqueous alkaline reaction media, said finely divided metallic silver catalyst being present in a concentration of from about one percent to about thirty percent by weight of the total reaction mixture, said aqueous alkaline reaction media having a maintained concentration of a free alkali metal hydroxide of not greater than about ten percent by weight of the total reaction mixture and said disproportionation being effected at a reaction temperature of from about 15° C. to about 65° C.

References Cited in the file of this patent
UNITED STATES PATENTS

| | | |
|---|---|---|
| 2,414,120 | Pearl | Jan. 14, 1947 |
| 2,419,158 | Pearl | Apr. 15, 1947 |
| 2,553,146 | Pearl | May 15, 1951 |

FOREIGN PATENTS

| | | |
|---|---|---|
| 782,430 | Great Britain | Sept. 4, 1957 |

OTHER REFERENCES

Berkman et al.: Catalysis, page 792 (1940).
Adams et al.: "Organic Reaction," vol. 2, (1944), pages 94–113.